(12) United States Patent
Qiao et al.

(10) Patent No.: US 9,759,116 B2
(45) Date of Patent: Sep. 12, 2017

(54) METHOD AND APPARATUS FOR DETECTING SELECTIVE CATALYTIC REDUCTION INJECTOR OPENING TIME

(71) Applicant: Continental Automotive Systems US, Inc., Auburn Hills, MI (US)

(72) Inventors: Ninsheng Qiao, Troy, MI (US); Donald Peter Kultgen, Garden City, MI (US); Marvin Lester Lynch, Detroit, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/065,537

(22) Filed: Oct. 29, 2013

(65) Prior Publication Data

US 2015/0113950 A1 Apr. 30, 2015

(51) Int. Cl.
*F01N 3/00* (2006.01)
*F01N 11/00* (2006.01)
*F01N 3/20* (2006.01)
*F02D 41/22* (2006.01)
*F02D 41/20* (2006.01)

(52) U.S. Cl.
CPC .............. *F01N 11/00* (2013.01); *F01N 3/208* (2013.01); *F01N 2550/05* (2013.01); *F01N 2610/02* (2013.01); *F01N 2610/146* (2013.01); *F01N 2900/0404* (2013.01); *F01N 2900/1821* (2013.01); *F02D 41/221* (2013.01); *F02D 2041/2055* (2013.01); *F02D 2041/2058* (2013.01); *Y02T 10/24* (2013.01); *Y02T 10/47* (2013.01)

(58) Field of Classification Search
CPC ................................ G06F 17/10; F01N 11/00
USPC ............................................................ 60/277
See application file for complete search history.

(56) References Cited

U.S. PATENT DOCUMENTS

| | | | |
|---|---|---|---|
| 4,823,825 A | 4/1989 | Buchl | |
| 5,535,621 A | 7/1996 | Glidewell et al. | |
| 5,808,471 A | 9/1998 | Rooke et al. | |
| 5,941,209 A | 8/1999 | Hashimoto | |
| 5,988,143 A | 11/1999 | Dietz et al. | |
| 6,115,727 A | 9/2000 | Schooler et al. | |
| 7,152,594 B2 | 12/2006 | Anilovich et al. | |
| 7,677,086 B2 | 3/2010 | Albertson et al. | |
| 7,802,563 B2 | 9/2010 | Behr et al. | |
| 8,880,276 B2 | 11/2014 | Qiao et al. | |
| 2005/0126635 A1* | 6/2005 | Addink et al. ............. | 137/487.5 |

(Continued)

FOREIGN PATENT DOCUMENTS

| | | |
|---|---|---|
| CN | 102797546 A | 5/2015 |
| DE | 3611220 A1 | 1/1987 |

(Continued)

OTHER PUBLICATIONS

U.S. Appl. No. 14/689,367, Continental Automotive Systems, Inc.
EP Search Report dated Mar. 18, 2015.

(Continued)

*Primary Examiner* — Mark Laurenzi
*Assistant Examiner* — Anthony Ayala Delgado

(57) ABSTRACT

A method for detecting an opening time of a valve, includes receiving a valve current profile of the valve and processing the valve current profile using at least a slope reflection detector to determine a status of the valve based on an output of the slope reflection detector.

24 Claims, 5 Drawing Sheets

(56) References Cited

U.S. PATENT DOCUMENTS

| | | | |
|---|---|---|---|
| 2007/0277777 A1 | 12/2007 | Barnes et al. | |
| 2009/0048802 A1* | 2/2009 | Wang et al. | 702/138 |
| 2012/0296551 A1 | 11/2012 | Kabasin | |
| 2013/0180323 A1 | 7/2013 | Peucat et al. | |
| 2014/0190453 A1 | 7/2014 | Qiao et al. | |
| 2015/0114099 A1 | 4/2015 | Qiao et al. | |
| 2015/0128568 A1 | 5/2015 | Barbier et al. | |

FOREIGN PATENT DOCUMENTS

| | | |
|---|---|---|
| DE | 4308811 A1 | 1/1994 |
| DE | 19730594 A1 | 2/1998 |
| DE | 102011078161 A1 | 9/2012 |
| EP | 0878617 B1 | 4/2001 |
| EP | 2060762 A1 | 5/2009 |
| EP | 2060763 A2 | 5/2009 |
| EP | 2585692 B1 | 4/2014 |
| JP | 6036739 | 2/1985 |
| JP | S61-250309 A | 11/1986 |
| JP | 9503270 | 3/1997 |
| JP | 200284140 | 9/2000 |
| JP | 2001280189 | 10/2001 |

OTHER PUBLICATIONS

U.S. Appl. No. 14/323,373, Continental Automotive Systems, Inc.
English Translation of the JPO Office Action dated Oct. 19, 2015.
Chinese Office Action for counterpart Chinese application No. 201410589824.7 dated Aug. 15, 2016.
First Search for counterpart Chinese application No. 201410589824.7, dated Aug. 3, 2016.

* cited by examiner

METHOD AND APPARATUS FOR DETECTING SELECTIVE CATALYTIC REDUCTION INJECTOR OPENING TIME

TECHNICAL FIELD

The present disclosure relates generally to selective catalytic reduction injector controls, and more specifically to a process for detecting an opening time and status of a selective catalytic reduction injector.

BACKGROUND OF THE INVENTION

The global drive to reduce NOx and CO2 emissions from diesel engine exhausts has led to the implementation of selective catalytic reduction systems in diesel engine vehicles to reduce the automotive emissions. Selective catalytic reduction systems operate by adding a gaseous or liquid reductant to the exhaust gas stream from an engine. The gaseous or liquid reductant is absorbed onto a catalyst where the reductant reacts with nitrogen oxides in the exhaust gas to form water vapor and nitrogen.

In order to properly interact with on-board diagnostic systems, such as OBD or OBDII, existing selective catalytic reduction systems include self-diagnostics to identify faults and enable pin point replacement while the vehicle is being serviced.

SUMMARY OF THE INVENTION

Disclosed is a method for detecting an opening time of a valve, including the steps of receiving an actuation current profile of the valve, processing the valve current profile using at least a slope reflection detector, and determining a status of the valve based on an output of the slope reflection detector.

Also disclosed is a vehicle including an exhaust system including a selective catalytic reduction injector, a controller operable to detect a current draw of the selective catalytic reduction injector, the controller being operable to detect a slope reflection in a current draw of the selective catalytic reduction injector, thereby detecting an opening time of the selective catalytic reduction injector.

Also disclosed is a method for controlling a selective catalytic reduction injector comprising the steps of Instructing a selective catalytic reduction injector to begin opening using a controller, receiving a selective catalytic reduction injector current profile of the selective catalytic reduction injector at the controller, processing the selective catalytic reduction injector current profile using at least a slope reflection detector in the controller, and determining an open status of the selective catalytic reduction injector based on an output of the slope reflection detector.

These and other features of the present invention can be best understood from the following specification and drawings, the following of which is a brief description.

DETAILED DESCRIPTION OF AN EMBODIMENT

Figure 1:
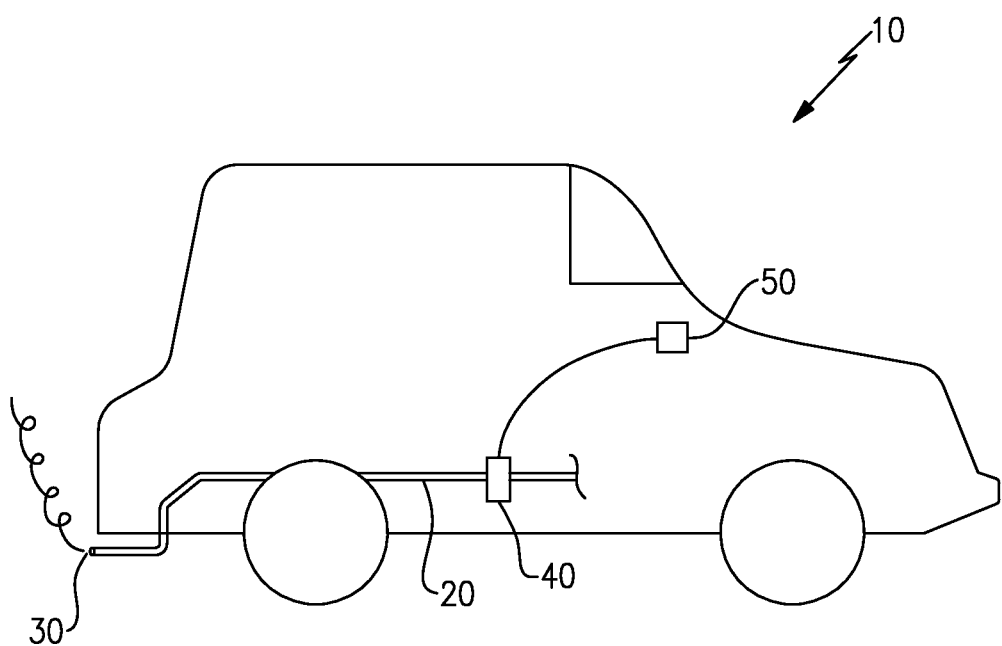
FIG. 1 illustrates a vehicle including a selective catalytic reduction injector for reducing emissions.

FIG. 1 schematically illustrates a vehicle 10 including an exhaust system 20 for expelling exhaust 30 from an internal combustion engine of the vehicle 10. The exhaust system 20 includes a selective catalytic reduction injector 40 that adds a gaseous or liquid reductant to the exhaust gas stream from the engine. The gaseous or liquid reductant is absorbed onto a catalyst where the reductant reacts with nitrogen oxides in the exhaust gas to form water vapor and nitrogen. The selective catalytic reduction injector 40 is controlled by a controller 50, and includes a sensor package capable of sensing inputs to and outputs from the selective catalytic reduction injector 40. In one example, the injector 40 is in the form of a solenoid valve.

One of the inputs that the sensor package can detect, and communicate back to the controller 50, is a current draw of the selective catalytic injector 40. This current draw can be aggregated by the controller 50 to determine a current profile of the selective catalytic reduction injector 40. Based on the current profile of the selective catalytic reduction injector 40, the controller 50 can determine a precise injector opening time and whether the injector is stuck or unstuck using the below described process.

The current profile of the selective catalytic reduction injector 40 is a function of battery voltage supplied to the injector, injector temperature and injector fluid pressure. At the conditions of low temperature, low pressure, and high voltage, the current profile of a nominal selective catalytic reduction injector 40 is almost the same as (superficially similar to) a stuck selective catalytic reduction injector, and a top level, or visual, inspection of the current profile is insufficient to identify a stuck injector or to precisely identify the opening time of the injector 40.

Figure 2:
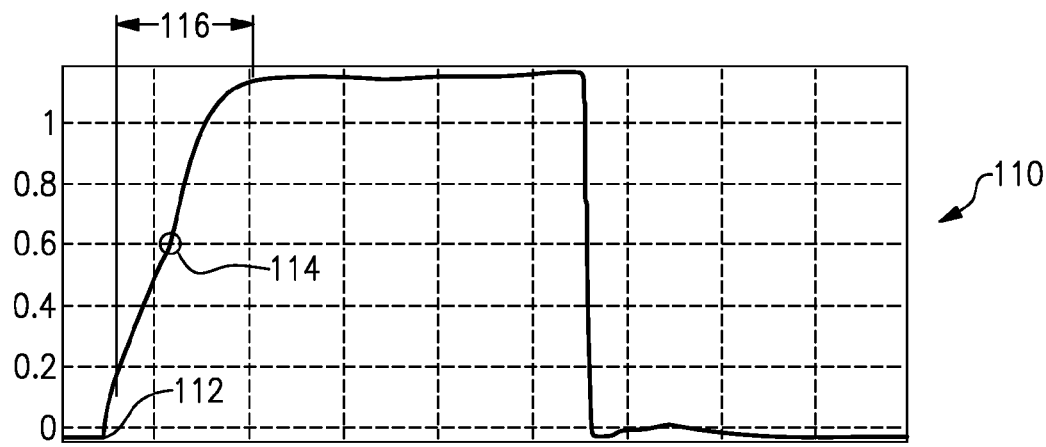
FIG. 2 illustrates a current profile of an opening selective catalytic reduction injector and a current profile of a stuck selective catalytic reduction injector with respect to time.
Figure 2:
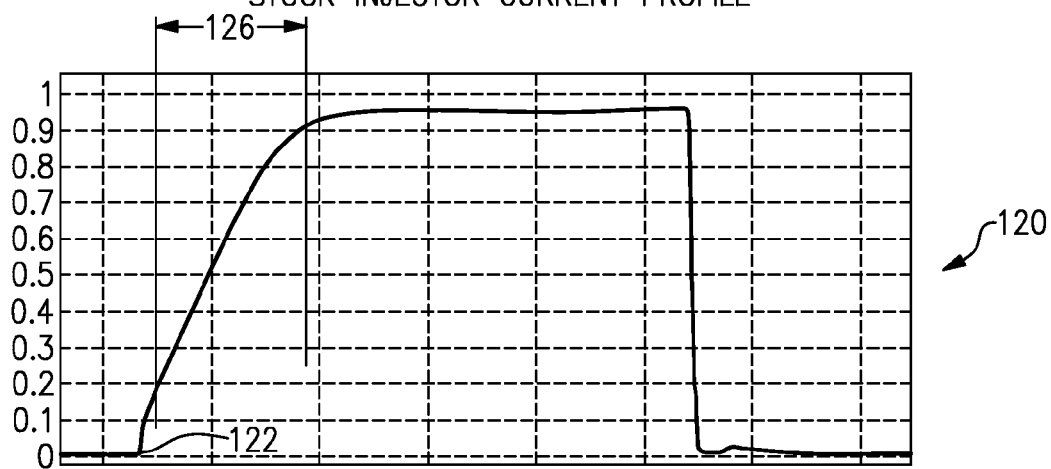

With continued reference to FIG. 1, FIG. 2 illustrates a current profile 110 of an opening selective catalytic reduction injector 40 and a current profile 120 of a stuck selective catalytic reduction injector 40 with respect to time. In the case of the opening selective catalytic reduction injector current profile 110, the injector 40 begins injecting (opening) at point 112, and the current profile 110 rises with a relatively constant slope. When the selective catalytic reduction injector 40 fully opens, the current profile 110 experiences a small slope change (referred to as a dip), illustrated at point 114. After the dip, the slope of the current profile 110 changes. In contrast, the current profile 120 of a stuck selective catalytic reduction injector 40 begins to open at point 122, and rises at a relatively constant slope through a detection window 126, without a dip.

The detection window 116, 126 of a current profile 110, 120 is the window during which the controller 50 analyzes the current profile to detect the presence of the dip 114. During this window 116, 126, the injector current data is processed by the controller 50 and fed to a slope reflection detector to detect the selective catalytic reduction injector 40 opening. The slope reflection detector can be another controller, a software module stored in a memory of the controller 50, or any other similar system.

Figure 3:
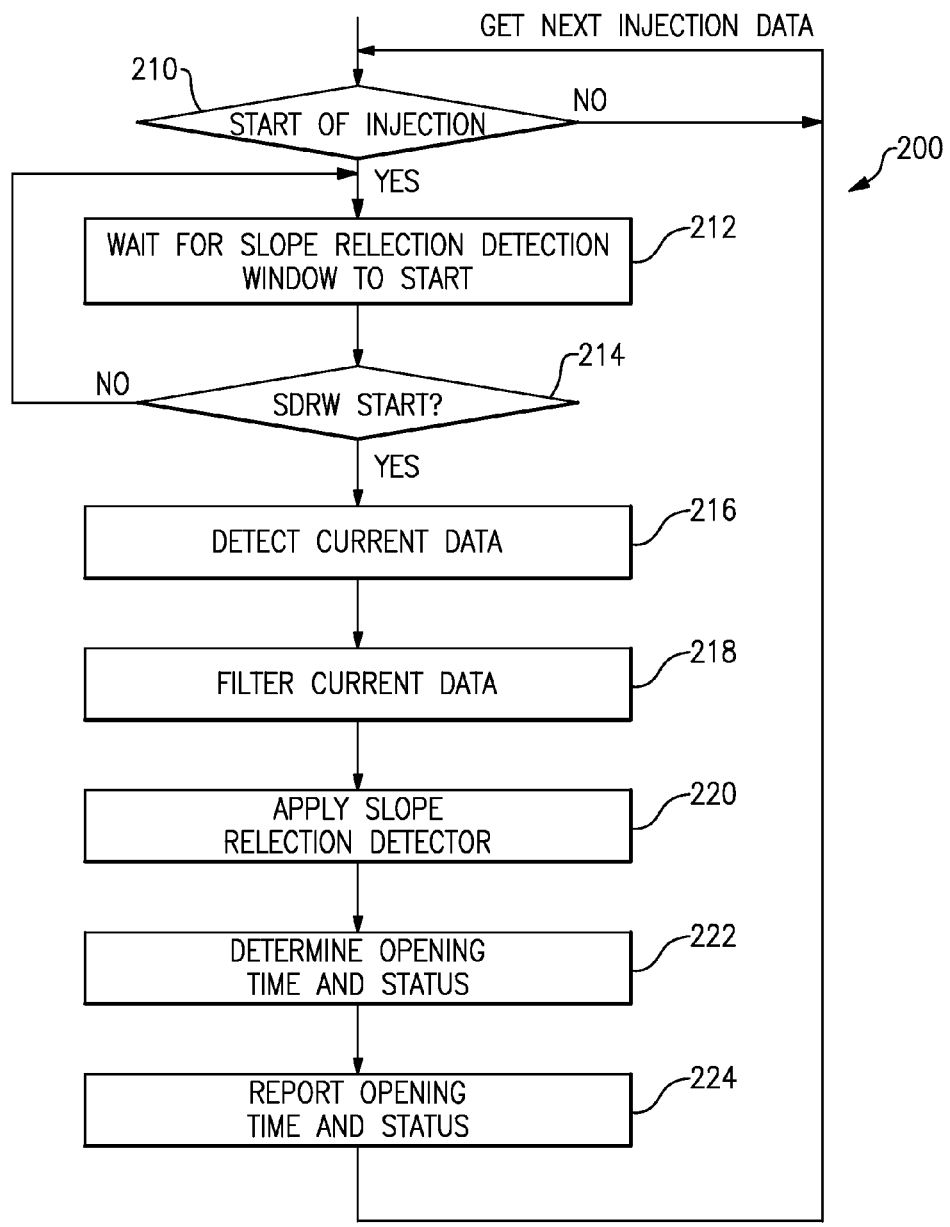
FIG. 3 illustrates a process for detecting an opening time and status of a selective catalytic reduction injector.

With continued reference to FIG. 1, FIG. 3 illustrates a process 200 utilized by the controller 50 to detect the open time of the selective catalytic reduction injector 40. Initially, the controller 50 checks to see if injection has started in a start of injection check step 210. If injection has not started, the process 200 loops back, and the start of injection check step 210 is performed again after a suitable delay.

If injection has started, the process 200 advances to a wait for slope reflection detection window to start step 212. As illustrated in FIG. 2, there is a delay period between when the injection begins at 112, 122 and when the detection window 116, 126 opens. In the step 212, the controller 50 waits the delay period between the start of injection and the beginning of the slope reflection detection window 116, 126 before moving to a slope reflection detection window start check 214.

If the slope reflection detection window has not started when the controller 50 performs the slope reflection detection window start check 214, the process loops back to the wait for slope reflection detection window to start step 212. If the slope reflection detection window 116, 126 has started, the controller 50 begins accumulating current data to construct a current profile of the injector 40 in a detect current data step 216. The current data can be accumulated using any acceptable sensor arrangement. In some examples, the current data is collected using an extremely high sampling rate. The sampling rate is the rate at which data samples are detected. By way of example, a sampling rate of 1 microsecond corresponds to one current detection occurring every microsecond.

In order to reduce the detected current data to a manageable condition and amount, the detected data is filtered by the controller 50 to remove high frequency noise using a standard digital filter. In example utilizing a high sampling rate, the data is further downsampled using known downsampling techniques to reduce the amount of data in the current profile. The filtering and downsampling is performed by the controller 50 in a filter current data step 218.

The filtered and downsampled data forms an injector current profile, such as the current profiles 110, 120 illustrated in FIG. 2. Once the current profile has been determined, the controller 50, or another slope reflection detector, applies a slope reflection detector process to the current profile in an apply slope reflection detector step 220. The process performed by the slope reflection detector is described below in greater detail with regards to FIG. 4.

The slope reflection detector determines if a slope reflection is present on the injector current profile. If no slope reflection is detected, the controller 50 sets the status of the injector 40 as "stuck" in a determine opening time and status step 222. A "stuck" status indicates that the injector 40 became stuck during opening and did not fully open. If a slope reflection is detected, then the controller 50 sets the injector 40 status as "open" and determines the time at which the injector 40 became fully open to be a minimum point of the slope reflection in the determine opening time and status step 222.

Once the opening time and status of the injector 40 has been determined, the controller 50 reports the opening time and status in a report opening time and status step 224. The reporting can be to another separate controller, a subprogram within the controller 50, or a diagnostic system, such as an OBD (On-Board Diagnostic) or OBDII (On-Board Diagnostic II). Alternately, the opening time and status can be reported to any other system where the opening time and status of the injector 40 is needed.

Figure 4:
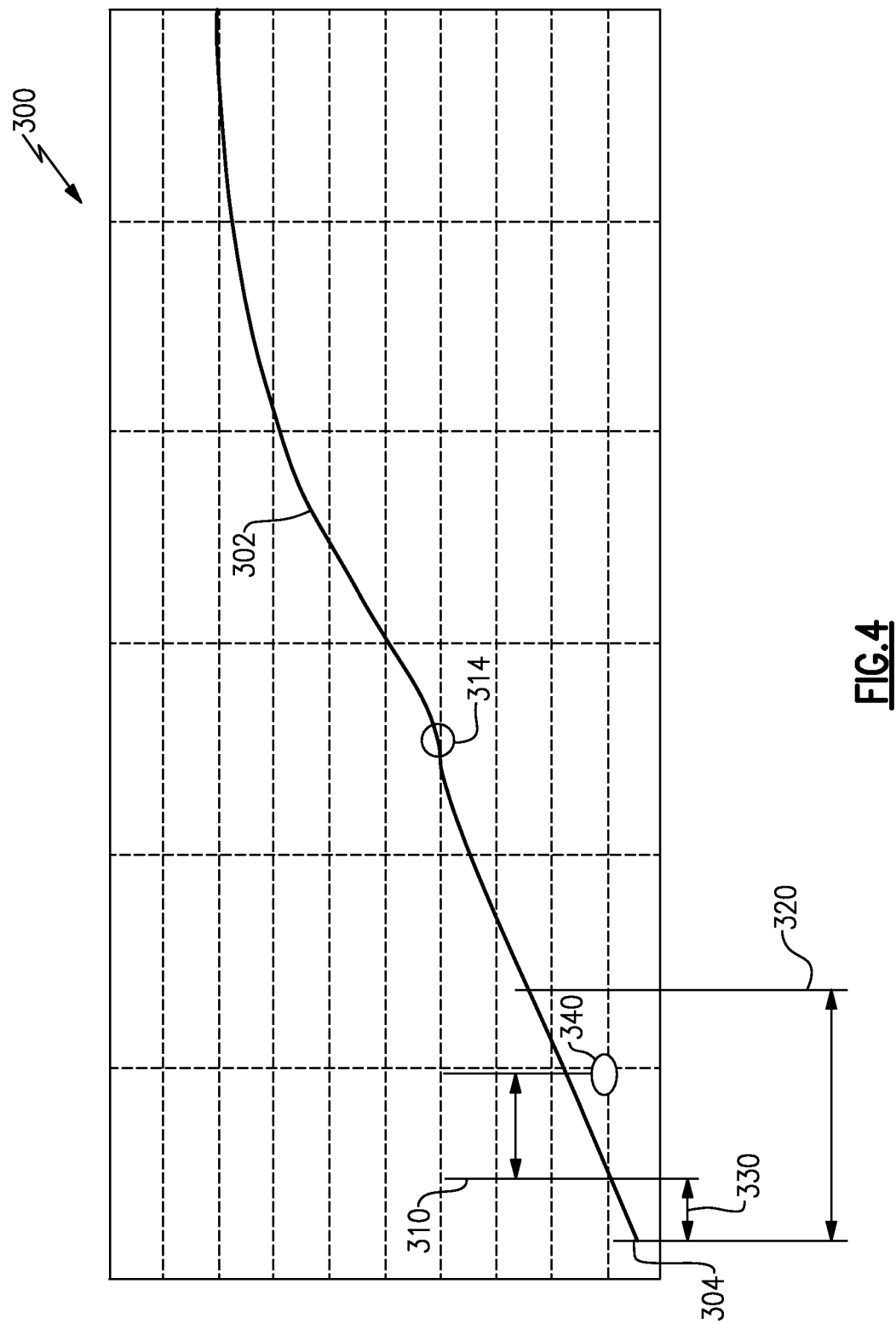
FIG. 4 illustrates a slope reflection detection scheme for the process of FIG. 2.

With continued reference to FIG. 1, FIG. 4 is a chart 300 illustrating a current profile 302 of an injector 40 including a slope dip 314. As described above, in order to determine the current profile 302, the controller 50 utilizes a nonlinear digital filtering technique to remove noise and downsamples the data to decrease the amount of data, thereby decreasing the data buffer size. Once the current profile 302 has been determined, the controller 50 applies the slope reflection detector.

The slope reflection detector utilizes a modified median filter to determine a slope reflection point 314. The slope reflection detector processes the current profile 302 entry by entry, replacing each entry with the centered value of neighboring entries falling within a median window 320 to determine a median current profile. The entries within the median window are then sorted in increasing value. The slope reflection detector further processes the current profile 302 entry by entry, replacing each entry with mean value of neighboring entries falling with a mean window 310 to determine a mean current profile.

As can be seen in FIG. 4, the mean window 310 is a smaller window (encompasses fewer neighboring data points) than the median window 320. Further, the mean window 310 falls entirely within the median window 320. The starting edge of the mean window 310 is offset from the starting edge of the median window 320 by an offset value 330. The size of both the mean window 310 and the median window 320, as well as the size of the offset 330, are calibration values that can be experimentally or mathematically determined for a particular selective catalytic reduction injector 40 by one of skill in the art having the benefit of this disclosure. Due to the required size of the windows 310, 320, the initial output of the slope reflection detection process occurs at point 340, and not at a start time 304 of the current profile 302. In the illustrated example of FIG. 4 the initial output 340 of the slope reflection detector occurs at the end point of the initial mean window 310.

The value of the output 340 is determined by the following relationship:

$$\text{Out} = \text{mid} * d_{fact} - (\text{mean} * g_{fact}).$$

Where Out is the output value, mid is the center value of the median window 320, mean is the mean value of the mean window 310, and $d_{fact}$ and $g_{fact}$ are variable factors. $d_{fact}$ and $g_{fact}$ are determined by the following relationships:

$$g_{fact} = 1 + \text{ABS}(\text{mid} - \text{mean})$$

$$d_{fact} = 1 - \text{ABS}(\text{mid} - \text{mean})$$

Where mid is the center value of the median window 320, mean is the mean value of the mean window 310, and ABS is the absolute value function.

As a result of the above relationships, the bigger the difference between the value of the median window 320 (mid) and the mean window 310 (mean), the greater the factor $g_{fact}$ will be. Similarly, the bigger the difference between the value of the median window 320 (mid) and the mean window 310 (mean), the smaller factor $d_{fact}$ will be. This difference in $g_{fact}$ and $d_{fact}$ results in an output (out) that greatly magnifies a slope reflection 314, while maintaining a relative constant value when no slope reflection is present.

Figure 5:
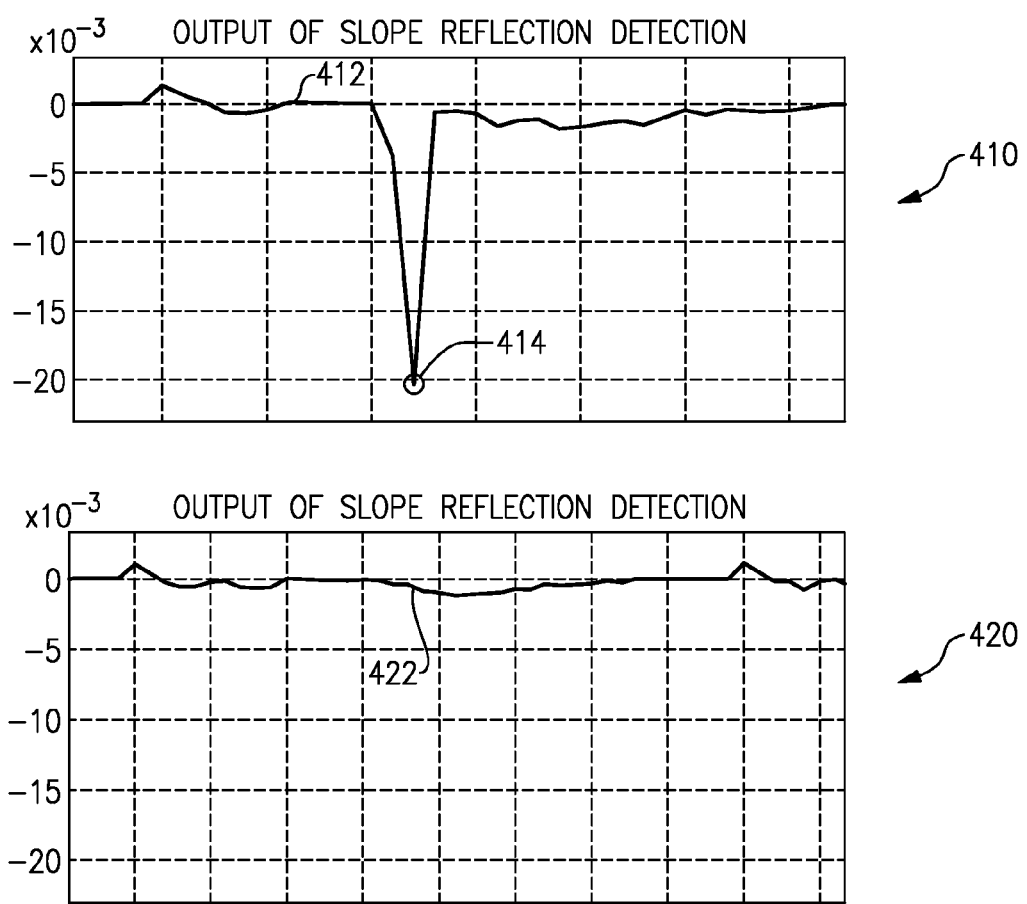
FIG. 5 illustrates an output chart of a slope reflection detector.

With continued reference to FIGS. 1 and 4, FIG. 5 illustrates an output chart 400 showing an output of the slope reflection detector when a slope reflection is present, at output 410 and when no slope reflection is present, at output 420. As can be appreciated based on the above, the slope reflection occurs when the selective catalytic reduction injector 40 becomes fully open, and no slope reflection occurs when the selective catalytic reduction is stuck.

In the non-stuck slope reflection chart 410, an output 412 of the slope reflection detector stays at an approximately 0 value until the slope reflection occurs. The slope reflection results in a sharp decrease in the output of the slope reflection detector for the duration of the slope reflection, after which the slope reflection detector output returns to the approximately 0 value. In contrast, when no slope reflection is present, as in slope reflection chart 420, the output of the slope reflection detector maintains the approximately 0 value for the entire duration. Based on this difference, the controller 50 can detect when the selective catalytic reduction injector 40 is stuck (i.e. when there is no slope reflection).

Further determinable from the slope reflection chart 410 is the precise time at which the selective catalytic reduction injector 40 becomes fully open. As the slope reflection occurs at the point that the selective catalytic reduction injector 40 becomes fully open, the precise fully open time of the selective catalytic reduction injector 40 is the minimum value point 414 of the output 412 of the slope reflection detector plus delay time and filter process offset. The precise opening time of the selective catalytic reduction injector 40 is precise to within a time period of the downsampled data rate. Thus, if the downsampled data rate is 1 microsecond, the time of the minimum value point 414 can fall within 1 microsecond of the actual fully open time of the selective catalytic reduction injector 40, depending on the system tolerances and slope reflection detector filter calibration.

By utilizing the above described process, the controller 50 can determine the precise opening time of a selective catalytic reduction injector and whether the selective catalytic reduction injector is stuck or non-stuck. As can be appreciated by one of skill in the art having the benefit of this disclosure, the above described process can be applied to any number of injector valves exhibiting similar slope reflection characteristics, and is not limited to selective catalytic reduction injectors.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for detecting operating characteristic of a valve, the method comprising:
   actuating the valve by way of a current draw;
   receiving, at a sensor package, sensed current draws from at least one sensor of the sensor package, the sensed current draws associated with the valve;
   receiving, at a controller in communication with the sensor package, the sensed current draws;
   determining, by the controller, a current profile of the sensed current draws;
   determining, by the controller, a presence of a slope reflection on the current profile;
   when the presence of a slope reflection on the current profile is detected:
      determining, by the controller, a non-stuck status of the valve;
      determining, by the controller, a time when the valve is fully open; and
      reporting, by the controller to an on-board diagnostics (OBD) system in communication with the controller, the non-stuck status of the valve and the time when the valve is fully open; and
   when the presence of a slope reflection on the current profile is not detected:
      determining, by the controller, a stuck status of the valve; and
      reporting, by the controller to the OBD system, the stuck status of the valve for identifying the valve for replacement.

2. The method of claim 1, wherein determining the presence of the slope reflection on the current profile comprises determining mid values of the current profile within a median window thereof and mean values of the current profile within a mean window thereof, and said median window and said mean window being defined data windows of the current profile of the valve.

3. The method of claim 2,
   wherein each output data point in the median window is a mid value of data points within the median window at a corresponding time;
   wherein the data points within the median window are sorted in increasing value; and
   wherein each output data point in the mean window is a mean value of data points within the mean window at a corresponding time.

4. The method of claim 3, wherein the mean window encompasses fewer data points than the median window, and where the mean window begins at a predefined offset from a median window start point.

5. The method of claim 2, wherein processing the valve current profile using at least a slope reflection detector comprises generating a slope reflection output according the relationship Out=mid*$d_{fact}$-(mean*$g_{fact}$), where Out is the slope reflection output at a given time, mid is the median value of the sorted data points in the median window at the given time, mean is the mean value of the data points in the mean window at the given time, and $d_{fact}$ and $g_{fact}$ are variable amplification factors.

6. The method of claim 5, wherein
   $g_{fact}$ is one plus the absolute value of the difference between the median value of the sorted data points in the median window at the given time and the mean value of the data in the mean window at the given time; and
   $d_{fact}$ is one minus the absolute value of the difference between the median value of the sorted data points in the median window at the given time and the mean value of the data in the mean window at the given time.

7. The method of claim 1, wherein determining a status of the valve based on an output of the slope reflection detector further comprises identifying a valley having an amplitude greater than a threshold in a slope reflection detector output and identifying the minimum data point in the valley, thereby identifying the opening time when the valve became fully open.

8. The method of claim 7, further comprising setting a valve open status of said valve based on identifying the opening time when the valve became fully open.

9. The method of claim 7, wherein identifying the opening time when the valve became fully open comprises identifying a location of the minimum data point of the output of the slope reflection detector.

10. The method of claim 1, wherein determining a status of the valve based on an output of the slope reflection detector further comprises identifying a lack of a valley having an amplitude greater than a threshold in the output of the slope reflection detector, thereby determining that the valve is in a stuck position and is not fully open.

11. The method of claim 10, further comprising setting a valve stuck status of said valve in response to determining that the valve is in a stuck position and is not fully open.

12. A vehicle comprising:
an internal combustion engine;
an exhaust system for receiving an exhaust gas stream from the engine, said exhaust system including a selective catalytic reduction injector;
at least one sensor operable to detect a current draw of the selective catalytic reduction injector, the current draw actuating the selective catalytic reduction injection; and
at least one controller connected to the at least one sensor, the at least one controller being operable to determine whether the selective catalytic reduction injector is operating properly, the at least one controller comprising a tangible memory storing instructions which, when executed by the at least one controller, causes the at least controller to
receive current draw information from the at least one sensor relating to current drawn by the selective catalytic reduction injector,
determine a current profile for the selective catalytic reduction injector based upon the received current draw information,
detect whether a slope reflection exists in the current profile and based upon the detection, determine whether or not the selective catalytic reduction injector is in a stuck state in which the selective catalytic reduction injector did not fully open; and
report the determination of whether the selective catalytic reduction injector is in the stuck state to an onboard diagnostic system associated with the vehicle, to identify for replacement the selective catalytic reduction injector if the selective catalytic reduction injector is determined to be in the stuck state.

13. The vehicle of claim 12, wherein the instructions which cause the at least one controller to detect a slope reflection comprise instructions to cause the at least one controller to perform determining a mid value from sorted data within a median window of entries from the current profile and determining a mean value from a mean window of entries from the current profile of the selective catalytic reduction injector.

14. The vehicle of claim 13,
wherein each output data point in the median window is a mid value of sorted data points within the median window of the valve current profile;
wherein the data points within the median window are sorted in increasing value; and
wherein each output data point of the mean window is a mean value of data points within the mean window.

15. The vehicle of claim 14, wherein the mean window encompasses fewer data points than the median window, and where the mean window begins at a predefined offset from a median window start point.

16. The vehicle of claim 12, wherein instructions which cause the at least one controller to detect a slope reflection comprise instructions to cause the at least one controller to generating a slope reflection output profile according the relationship Out=mid*$d_{fact}$−(mean*$g_{fact}$), where Out is the slope reflection output at a given time, mid is the median value of the sorted data of the median window at the given time, mean is the mean value of the data in the mean window at the given time, and $d_{fact}$ and $g_{fact}$ are variable amplification factors.

17. The vehicle of claim 16, wherein
$g_{fact}$ is one plus the absolute value of the difference between the median value of the sorted data points in the median window at the given time and the mean value of the data points in the mean window at the given time; and
$d_{fact}$ is one minus the absolute value of the difference between the median value of the sorted data points in the median window at the given time and the mean value of the data points in the mean window at the given time.

18. A method for controlling a selective catalytic reduction injector, the method comprising:
controlling, by a controller, a selective catalytic reduction injector to actuate by way of a current draw;
receiving at the controller, a plurality of selective catalytic reduction injector current values of the selective catalytic reduction injector corresponding to the selective catalytic reduction injector opening;
generating, by the controller, a current profile from the plurality of selective catalytic reduction injector current values received;
determining, by the controller, whether a slope reflection exists in the current;
determining a status of the selective catalytic reduction injector based on whether a slope reflection is detected, the status determined being one from a status group including an open status in which a valve of the selective catalytic reduction injector is fully open and a stuck status corresponding to the valve being in a stuck state;
when the status of the selective catalytic reduction injector is the stuck status, reporting the stuck status of the selective catalytic reduction injector to an onboard diagnostic system to identify the selective catalytic reduction injector for replacement, and
when the status of the selective catalytic reduction injector is the open status, identifying an opening time when the selective catalytic reduction injector became fully open and reporting the opening time to the onboard diagnostic system.

19. The method of claim 18, wherein the determining whether the slope reflection exists in the current comprises:
determining a mid value from a median window and determining a mean value from a mean window of the current profile of the selective catalytic reduction injector; and
generating a slope reflection output according the relationship Out=mid*$d_{fact}$−(mean*$g_{fact}$), where Out is the slope reflection output at a given data point, mid is the median value of the data in the median window at the given time, mean is the mean value of the data in the mean window at the given time, and $g_{fact}$ is one plus the absolute value of the difference between the value of mid and the value of mean;
and $d_{fact}$ is one minus the absolute value of the difference between the value of mid and the value of mean.

20. The method of claim 19, wherein the determining whether the slope reflection exists in the current further comprises identifying whether a valley of sufficient amplitude exists in the slope reflection output and identifying the minimum data point in the valley upon an affirmative detection of the valley, wherein determining the status comprises determining the open status upon an affirmative detection of the existence of the valley, and wherein identifying the opening time when the selective catalytic reduction injector became fully open comprises determining a time corresponding to the minimum data point in the valley.

21. The method of claim 20, wherein determining the status comprises determining the stuck status upon a failure to detect the valley in the slope reflection output.

22. The vehicle of claim 12, wherein the instructions to detect a slope reflection comprise instructions to create a median current profile based upon the current profile and a mean current profile based upon the current profile, and calculate an output profile based upon the median current profile and the mean current profile, and wherein determining whether the selective catalytic reduction injector is in the stuck state is based upon the output profile.

23. The vehicle of claim 22,
wherein the instructions for creating the median current profile comprise instructions for generating, for each entry in at least a predetermined median window of the current profile, a center value of neighboring entries within the predetermined median window, the generated center values forming the median current profile,
wherein the instructions for creating the mean current profile comprise instructions for generating, for each entry in at least a predetermined mean window of the current profile, a mean value of neighboring entries in the predetermined mean window, the generated mean values forming the mean current profile, and
wherein the instructions to calculate the output profile comprise instructions for calculating an output profile, each output profile entry OUT being based upon $$OUT=MID*d_{fact}-(MEAN*g_{fact}),$$

where OUT is the output profile entry at the given time, MID is the center value of the median window at the given time, MEAN is the mean value of the data in the mean window at the given time, and $d_{fact}$ and $g_{fact}$ are variable amplification factors.

24. The vehicle of claim 23, wherein the instructions for determining whether the selective catalytic reduction injector is in the stuck state comprises instructions for determining that not one of the OUT values represents a spike, in at least one of a downward direction and an upward direction, relative to other of the OUT values, and upon the spike being present, the time the selective catalytic reduction injector is determined to be fully open is based upon the given time corresponding to a value of the spike having the greatest magnitude.

* * * * *